May 21, 1968

F. CONCHE ET AL 3,383,923

BENCH FOR TAKING SAMPLES OF LIQUIDS AND
IN PARTICULAR RADIOACTIVE LIQUIDS

Filed April 16, 1965

Inventors:
François CONCHE
Jacques DUBOZ
René GUILLOTEAU
Jean PILLERAULT by: J. Delattre Seguy
Attorney

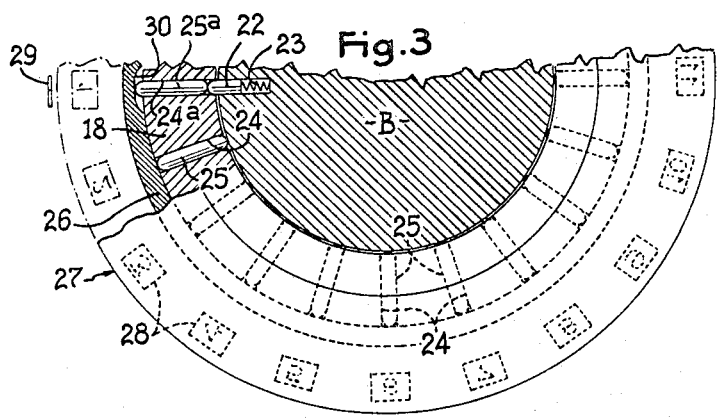
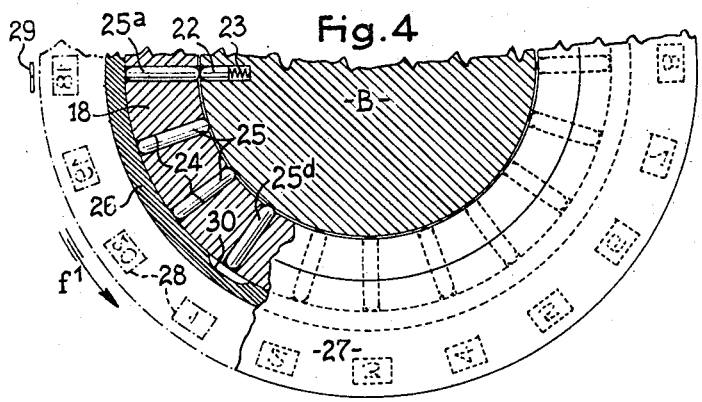
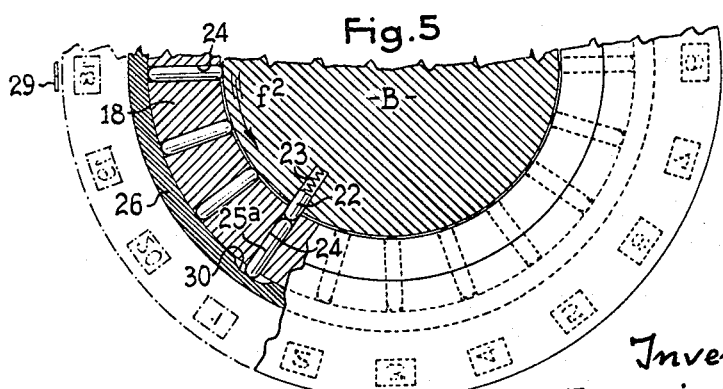

Inventors:
François CONCHE
Jacques DUBOZ
René GUILLOTEAU
Jean PILLERAULT
by J. Delattre-Seguy
Attorney May 21, 1968
F. CONCHE ET AL
3,383,923
BENCH FOR TAKING SAMPLES OF LIQUIDS AND
IN PARTICULAR RADIOACTIVE LIQUIDS
Filed April 16, 1965
5 Sheets-Sheet 4
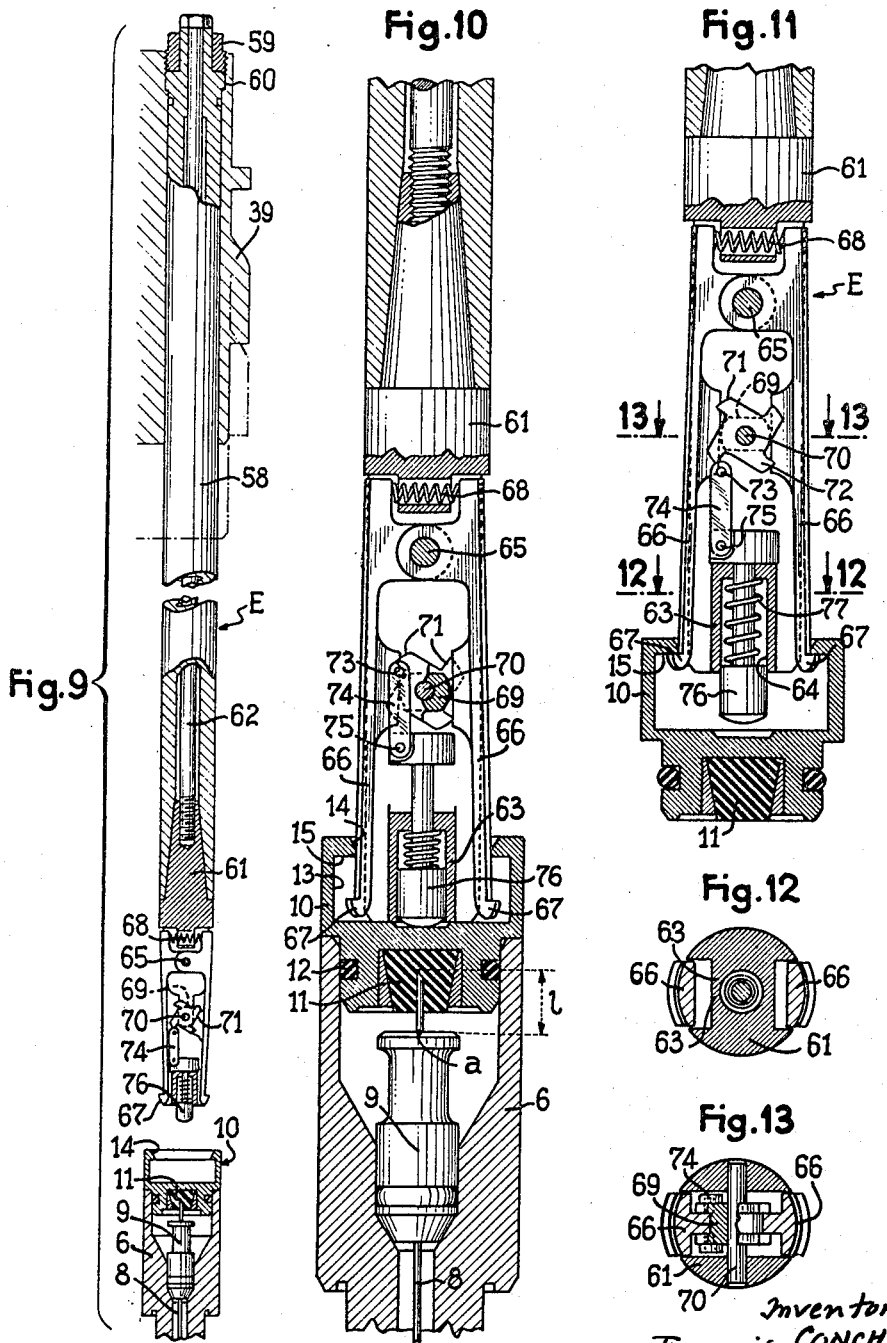

May 21, 1968 F. CONCHE ET AL 3,383,923
BENCH FOR TAKING SAMPLES OF LIQUIDS AND
IN PARTICULAR RADIOACTIVE LIQUIDS
Filed April 16, 1965 5 Sheets-Sheet 5
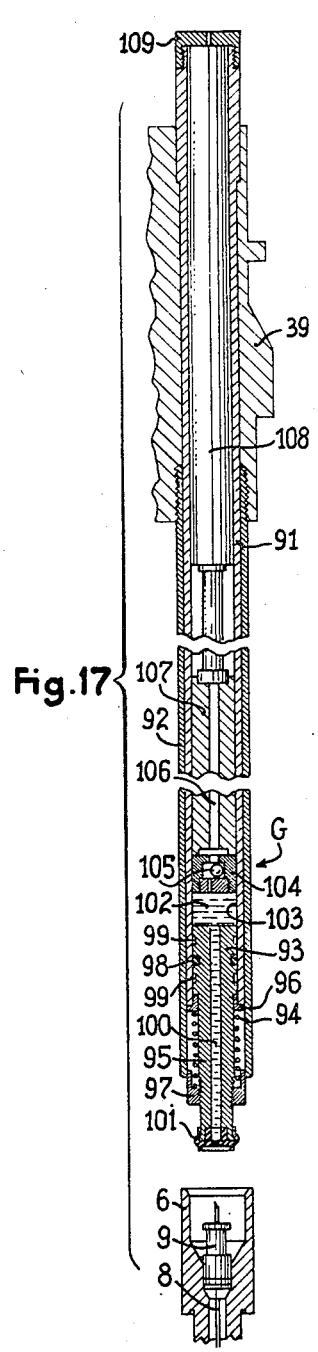
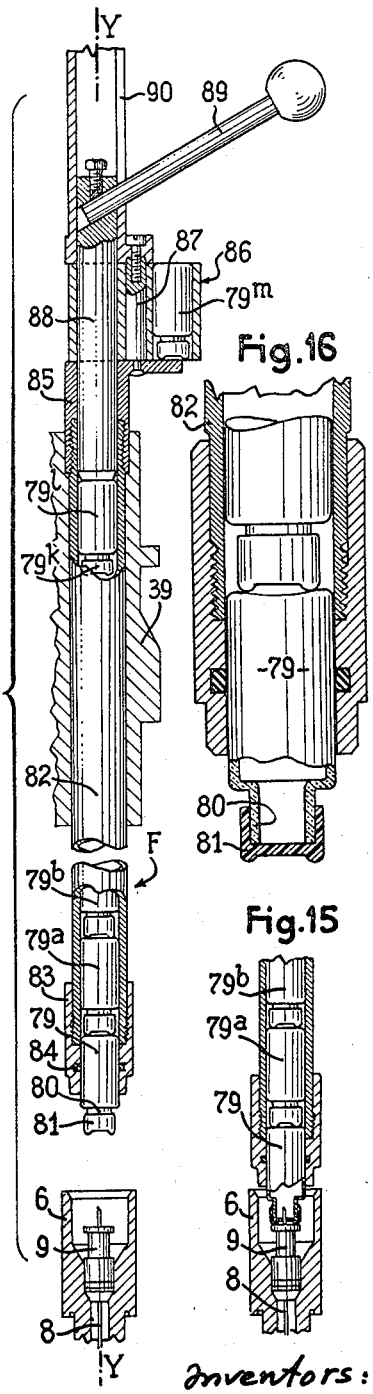
Inventors:
François CONCHE, Jacques
DUBOZ, René GUILLOTEAU, Jean
PILLERAULT
by J. Delatte-Seguy
Attorney

United States Patent Office 3,383,923
Patented May 21, 1968

3,383,923
BENCH FOR TAKING SAMPLES OF LIQUIDS AND IN PARTICULAR RADIOACTIVE LIQUIDS
Francois Conche, Massy, Jacques Duboz, Meudon, Rene Guilloteau, Cachan, and Jean Pillerault, Paris, France, assignors to Commissariat à l'Energie Atomique, Paris, France, a French corporation
Filed Apr. 16, 1965, Ser. No. 448,687
Claims priority, application France, Apr. 20, 1964, 971,504
17 Claims. (Cl. 73—421)

ABSTRACT OF THE DISCLOSURE

A liquid sampling apparatus for obtaining samples from plural liquid sources. A centrally located enclosed chamber is provided with plural hollow needles extending thereinto each communicating with a separate source of liquid. A manipulative means extending into the chamber is provided for removing a cover from the needle, supplying a series of sample bottles each sealed with a rubber plug, evacuating the bottles, empaling the rubber plugs of the bottles upon the needles for taking the samples and subsequently rinsing the needles before returning their covers.

---

The present invention relates to the taking of samples of liquids, and in particular radioactive liquids, through a hollow needle extending into a chamber located under the working plane of the bench, the sample being put into a bottle or "pot" in which a vacuum is created and the bottle being thereafter thrust onto the needle so that the vacuum causes a given volume of liquid to rise therein.

The object of the present invention is to provide means for taking any one of a plurality of samples from independent chambers by means of predetermined selecting movements.

The invention provides a bench permitting the aforementioned selected sampling, said bench being located above the chambers containing the various liquids to be sampled and comprising in combination: a glove box having a base comprising the end elements of a plurality of hollow needles each of which is adapted to extend into one of the chambers, the centres of the ends of said end elements being located on at least one circumferential arc; a support above said end elements and rotatable about a first axis; a tool carrier rotatable in said support about a second axis different from the first axis and movable along said second axis; and a plurality of tools to be employed in succession for taking the samples and disposed in said tool carrier in eccentric positions in parallel relation to the second axis and at equal distances therefrom.

Owing to this arrangement, it is possible, in rotating the support about the first axis, to bring the tools in the vicinity of any one of said end elements, and, in rotating the tool carrier about the second axis, to bring the extension of the axis of any tool selected from the tools onto the centre of the end of said end element, and in shifting the tool carrier along the second axis, to move said selected tool toward or away from said end element.

In one embodiment of the invention, the axis of rotation of the support is preferably perpendicular to the plane containing the circumference on which the centres of the ends of said end elements are located, and the second axis is concurrent with, and inclined relative to, the first axis, the inclination being such that when the support is rotated about the first axis, the extension of the second axis can be brought successively to within a distance from each one of the centres of the ends of said end elements which is equal to the eccentricity of the axis of the tools relative to the second axis. In this embodiment, the axis of the tool carrier describes a cone where axis corresponds to the first axis.

In another embodiment the support is pivotable about a first axis which is perpendicular to the plane containing the circumference intersecting the centres of the ends of said end elements of the needles. In this embodiment, when the support is pivoted about the first axis, the axis of the tool carrier sweeps through a plane parallel to said plane containing the centres of the ends of said end elements, and the rotation and the sliding of the tool carrier in said support insures respectively the selection of a tool and the actuation thereof, as in the first-mentioned embodiment.

Further features and advantages of the invention will be apparent from the ensuing description with reference to the accompanying drawings to which the invention is in no way limited.

In the drawings:

FIG. 3 is a partial sectional view taken along line 3—3 of FIG. 1 with parts cut away;

FIG. 4 is a view similar to FIG. 3 showing the selection of another position for the rotary support;

FIG. 5 is a view similar to FIG. 3 showing the support in said other position;

FIG. 9 is an elevational view, partly in section and on a reduced scale, of the tongs for extracting from the end element of any one of the hollow needles the plug which ordinarly closes said end element;

FIG. 10 is an elevational view, partly in section and on an enlarged scale showing the introduction of tongs in the plug;

FIG. 11 is a view similar to the lower part of FIG. 10 of the various elements after the plug has been removed;

FIGS. 12 and 13 are sectional views taken along lines 12—12 and 13—13 of FIG. 11;

FIG. 14 is an elevational view partly in section and with parts cut away, of the sampling tool and one of the end elements before the tool has been lowered onto said end element;

FIG. 15 is a view of a lower part of FIG. 14 showing the arrangement at the moment a sample is taken;

FIG. 16 is a partial longitudinal view on an enlarged scale;

FIG. 17 is a longitudinal sectional view, with parts cut away, of the rinsing tool in position above the end element of a needle;

FIG. 18 shows the tool in the rinsing position, and

Figure 19:
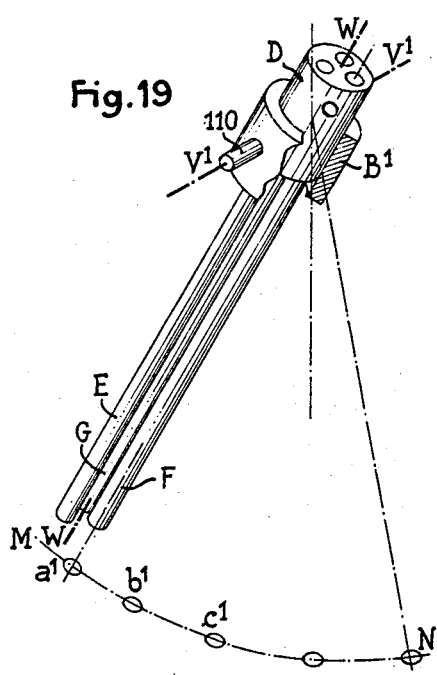

FIG. 19 is a diagram of a variant of a bench in which the support swings about an axis perpendicular to the plane containing the circumference intersecting the centres of the ends of the end elements.

I—Description of the bench (FIGS. 1-8)

Figure 1:
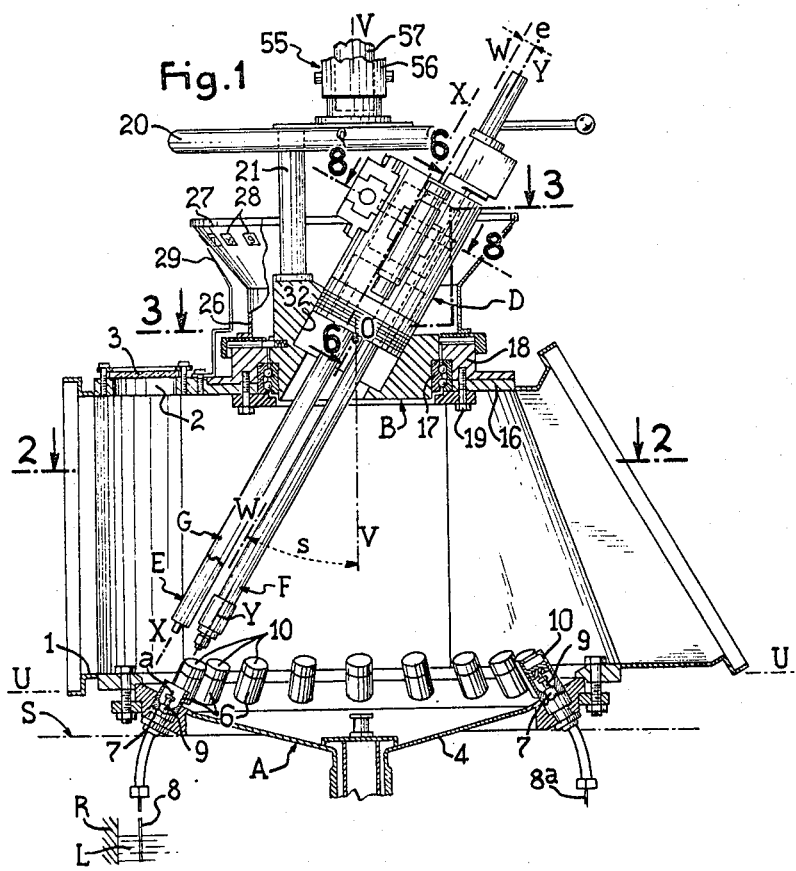
FIG. 1 is a diagrammatic vertical sectional view of a bench according to the invention in the plane containing the axis of rotation of the support and the axis of rotation and translation of the tool carrier.

This bench is adapted to be secured to a frame or other support S, diagrammatically shown in FIG. 1 by a horizontal dot-dash line, and comprises a glove box A. This glove box compises lateral openings 1 provided with transparent walls (not shown) and, on the upper part, a porthole 2 with a glass pane 3. Provided on the solid periphery of the base 4 thereof is a series of $n$ members 6 which are evenly spaced apart on a circumference. $(n-1)$ of said elements receive each the end element 9 of one of $(n-1)$ needles 8. Said needles 8 extend below the bench into fluidtight and closed containers, such as that shown partially at R, containing liquids L which are required to be sampled. The needle 8a (shown on the right side of FIG. 1) has a different function. It is in fact a suction needle connected to a pump or other source of vacuum and provided for connecting the bottles or other containers for taking samples to a vacuum.

Each needle 8 or 8a terminates within the corresponding members 6 by an end element 9 (see especially the detail views of FIGS. 9 and 10 and following figures). The needle extends upwardly beyond the end element a distance $l$ (FIG. 10).

The members 6 are so spaced apart that the centres $a$, $b$, $c$, $d$ . . . of the ends of the $n$ elements 6 are located (FIG. 2) on a circumference T having a centre $o$ located in a horizontal plane U—U (FIG. 1).

Each member 6 is provided with a detachable plug 10 (see in particular FIGS. 1, 9 and 10) which caps the end element 9 of the needle and comprises on its inner face a mass 11 of rubber or like material which is forced onto the end of the needle so as to close it when the plug 10 is forced into the members 6 (see FIG. 10).

The seal between the plug 10 and the member 6 is achieved by a sealing element 12 located in a peripheral groove formed in the plug.

It will be observed that the plug extends beyond the member 6 by a cylindrical skirt portion forming a cavity 13 which communicates with the exterior through an outwardly flaired frustoconical aperture 14. An inner shoulder 15 is formed around said aperture and its function will be explained hereinafter.

Figure 2:
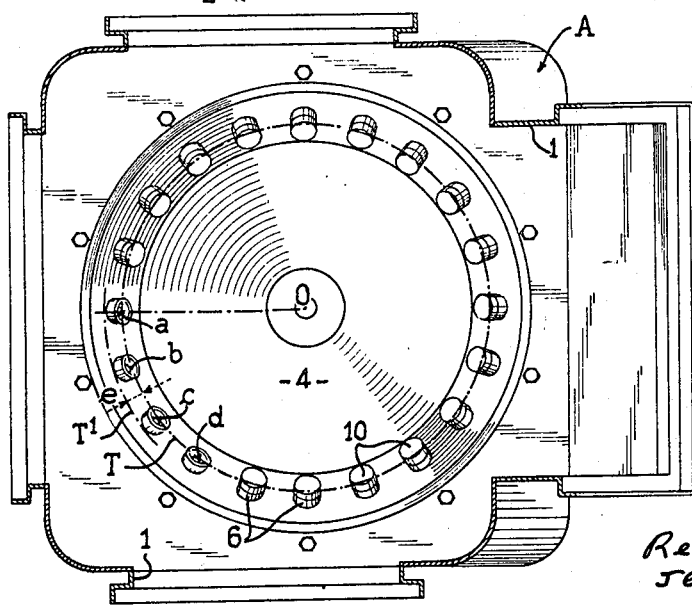
FIG. 2 is a diagrammatic horizontal sectional view, taken along line 2—2 of FIG. 1, the cross-sectional view of the tools having been omitted in this figure.
Figure 6:
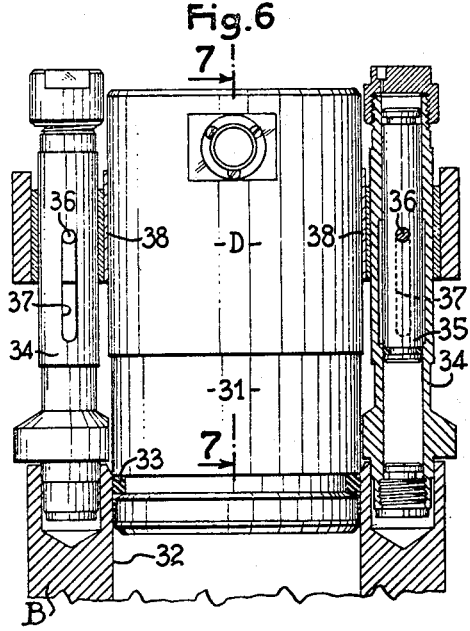
FIG. 6 is a sectional view, taken along line 6—6 of FIG. 1, on an enlarged scale of the jacks for shifting the tool carrier.
Figure 7:
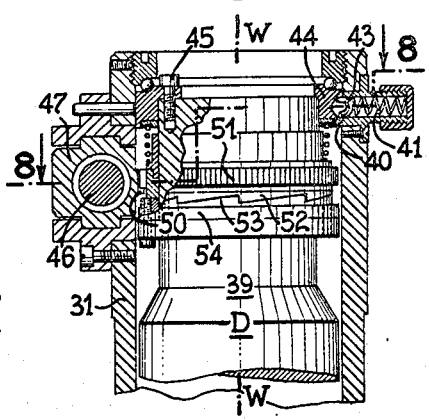
FIG. 7 is a sectional view, taken along line 7—7 of FIG. 6, this sectional view having been brought to a vertical position although it is in fact inclined since it corresponds to the section of the tool carrier through the plane of FIG. 1.

Rotatably mounted on the top 16 of the glove box A is a support B which is rotative about a vertical axis V—V which is perpendicular to the plane U—U and whose downward extension intersects the centre $o$ of the circumference T (FIG. 2).

The fixing, control and locking details concerning the support B will be explained hereinafter. Mounted in said support B is a tool carrier D rotatable and slidable along an axis W—W which is oblique relative to the axis V—V and intersects the latter at the point O. The axis W—W therefore describes a cone having a half-angle at the apex $s$ when the support B rotates on the box A about the vertical axis V—V.

The tool carrier D carries different tools, and in the presently-described embodiment three tools, namely:

An unplugging tool E for removing and replacing the plugs 10.

A sampling tool F for filling the bottles or other small containers disposed in this tool and previously put under a vacuum by the needle 8a, each bottle being engaged on one of the needles 8 corresponding to the sample to be taken after the corresponding member 6 has been unplugged.

A rinsing tool G for cleaning the needle 8 through which the sample has been taken.

Figure 8:
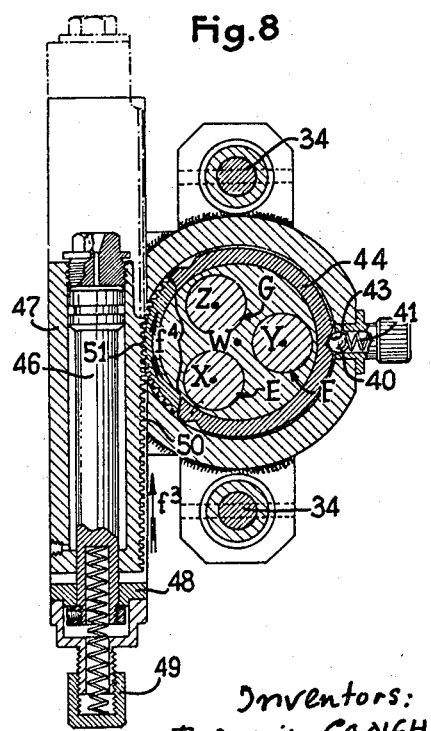
FIG. 8 is a horizontal sectional view, taken along line 8—8 of FIG. 7, and along the same line 8—8 shown in FIG. 1.

These tools E, F and G, have their respective axes X—X, Y—Y and Z—Z (see in particular FIG. 8) equally spaced from the axis W—W, their eccentricity having the same value $e$ (FIGS. 1 and 8).

The angle $s$ and the position of the point O are so selected (FIG. 1) that the line projection on the plane U—U by the conical surface described by the axis W—W when the support B rotates about the axis V—V, is a circumference $T_1$ (FIG. 2) which is concentric with the circumference T and therefore has the same centre $o$ but is such that the difference between the radii of the two circumferences is equal to the aforementioned eccentricity $e$. In the presently-described embodiment, the circumference $T_1$ has a radius exceeding that of the circumference T.

Thus, under these conditions:

(1) When the support B is rotated on the glove box A, it is possible to bring the axis W—W into any radial plane intersecting the axis V—V so that for example the intersection of this axis W—W on the plane U—U is at $w$ on the radius $o$-$a$ intersecting the centre of the end of the end element of any given needle. This permits selecting the desired needle through which the sample will be taken.

(2) When the tool carrier D is rotated about the axis W—W it is thus possible to cause any one of the axes of the tools X—X . . . Z—Z (for example the axis Y—Y pertaining to the tool F (FIG 1) to intersect the plane U—U at the centre $a$ (or $b$ or $c$ . . .). This permits selecting the tool to be employed.

(3) By shifting the tool carrier D longitudinally in the support B along the axis W—W, the tool which has been brought to the position that the tool F occupies in FIG. 1 can be removed toward or away from the end element 9 of the needle and this permits effecting the intended operation of this tool.

There will now be described in detail the illustrated embodiments of the support B, the tool carrier D. Thereafter, the three tools E, F and G will be described.

Assembly of the support B, its control and locking (FIGS. 1, 3 and 5).

The support B is rotatable owing to the provision of ball bearings 17 in the top 16 of the glove box A and in a ring 18 attached to the top 16 by screws 19. The support can be rotated manually by means of handwheel 20 fixed thereto by posts 21.

The support B can be held stationary in $n$ given angular positions, ($n$ being the total number of needles 8, 8a) by a locking element 22 (see FIGS. 3–5). This locking element is radially movable in the support B and is biased outwardly by a spring 23 which tends to engage it in any one of $n$ radial apertures 24 formed in the fixed ring 18, but only when the inner portion of this aperture is freed of a rod 25 which is radially movable in the aperture 24 and is normally maintained in a position in which it completely obturates the corresponding aperture, by a selecting collar 26. This collar 26 is rotatable about the ring 18 and constitutes in its upper flared portion 27 (FIGS. 1, 3) a shifting handwheel which comprises on its outer face a graduation 28 composed of angularly equally spaced numbers ranging from $l$ to $n$. This graduation 28 moves in front of a fixed reference or index 29.

The selecting collar 26 comprises on its inner face a single cavity 30 adapted to pass in front of the various rods 25 when the collar is rotated.

In the illustrated embodiment, $n$ is assumed to be equal to 20 and the graduation 28, the position of the reference 29 and the position of the cavity 30 in the collar 26 are such that when a given value of the graduation 28 is brought in front of the reference 29, the cavity 30 is located in front of the rod 25 corresponding to the needle of the order indicated by the value selected from the graduation.

For example, if in FIG. 3 the value "1" of the graduation is in front of the reference 29, the rod 25a is engaged in the cavity 30 and thus permits the locking element 22 to be biased by the spring 23 into the cavity 25a which corresponds to the order "1", namely to the needle of this order "1".

In FIG. 4, as the selecting collar 26 has been turned in the direction of arrow $f_1$ so that the value "18" of the graduation is in front of the reference 29, the cavity 30 occupies a position in front of the rod 25a which corresponds to the locked position of the support B which is such that one of the tools is located in front of the needle of the order "18", this position being obtained by rotating the support B from the position shown in FIGS. 3 and 4 to the position shown in FIG. 5 in the direction of arrow $f_2$ until the locking element 22 enters the aperture 24$d$ whose pin 25$d$ has withdrawn into the cavity 30. Thus, it is possible, by shifting the selecting collar (26–27), to bring, by rotating the support B, the tool carrier in front of any one of the $n$ needles 8 or 8$a$.

Assembly and control of the tool carrier D (FIGS. 1, 6–8).

This tool carrier D comprises a sleeve 31 slidably mounted in a bore 32 which has an axis W—W and is formed in the support B, a seal being achieved between the sleeve and the bore by a sealing element 33 provided on the sleeve. The latter is moved longitudinally by two jacks (shown in FIG. 6, one of them also being shown in elevation but separate from its support in FIG. 1).

Each of these jacks comprises a cylinder 34 secured to the support B. Slidable in this cylinder is a piston 35 which a pin 36 extending through a slot 37 in the cylinder connects to a lug 38 carried on the side of the sleeve 31. Rotatable within the sleeve 31 (FIGS. 7 and 8) is a barrel 39 carrying the three tools E, F and G.

The tool-carrying barrel 39 is rotatable about the axis W—W and can be locked in three positions 120° apart by a locking element formed, for example, by a ball 40 biased by a spring 41 and engaging in one of three recesses 43 formed in at ring 44 secured to the barrel 39 by screws 45.

The tool-carrying barrel 39 is rotated by a lateral jack having a fixed piston 46 and a movable cylinder 47. The piston 46 is connected to a fixed distribution head 48 which is secured to the rotary support B. A nut device 49 is provided for adjusting the position of the piston. The movable cylinder 47 comprises, laterally, a rack 50 which meshes with the teeth 51 of a ratchet wheel 52. The latter forms a free wheel owing to the provision of teeth 53 on a complementary ring 54 secured to the tool-carrying barrel 39.

Each forward movement of the rack 50 in the direction of arrow $f^3$ (FIG. 8) therefore rotates the ratchet wheel (51–52) in the direction of arrow $f^4$ and drives the barrel in the same direction and at the same time urges the locking ball 40 out of the recess 43 in opposition to the action of the spring 41. The return movement of the rack 50 drives the ratchet wheel (51–52) in the manner of a freewheel, the barrel 39 remaining locked in position by the ball 40.

It will be observed that the two jacks (34–35) for shifting the tool carrier D in the longitudinal direction and the jack (46–47) for rotating the tool-carrying barrel 39 are fed with fluid under pressure (preferably oil) by a distributor having a rotating joint provided at 55 (FIG. 1) at the upper part of the bench, this joint comprising a fixed outer element 56 and a rotary distributor core 57 controlled manually.

*The unplugging tool E (FIGS. 9–13)*

The tool is adapted to remove and replace the plug 10 pertaining to the member 6 which corresponds to the needle 8 through which a sample is to be taken, the support B having been brought by the selecting collar (26–27) in front of the corresponding needle.

The tool E comprises a tube 58 which a nut 59 holds in position owing to a support shoulder 60 in the tool-carrying barrel 39. Fitted at the lower end of this tool is a tongs carrier 61 which is held in position by a traction rod 62.

The tongs carrier 61 is machined in the shape of a fork, the two branches of the fork being, however, united toward their ends by a portion 63 provided with a blind hole 64. Pivoted between the two branches on a pin 65 are two jaws 66 of the tongs. These two jaws are provided at their free ends with two outer projections forming hooks 67 which are adapted to bear, when they are separated, against the inner shoulder 15 of the plug 10. The two jaws are biased so as to move toward each other—and consequently in the direction for disengaging the hooks 67—by a spring 68 which causes them to bear inwardly against a cam 69 which is rotatably mounted on the branch of the body of the tongs 61 by a transverse pin 70 parallel to the pin 65.

The cam 69 has a rectangular cross-sectional shape and is disposed between two inner ribs 71 carried by the jaws of the tongs. The dimensions are such that when the cam has its large sides horizontal (FIGS. 10 and 11) the jaws are separated, the spring 68 being compressed, whereas when the cam has its large sides vertical, after having rotated through 90° to the position shown in FIG. 9, the jaws are moved toward each other under the action of the spring 68 (FIG. 9).

The cam 69 is rotated through a quarter of a rotation by a cross which has four branches 72 and is rigid with the cam. The branches of the cross co-operate with lugs 73 on two twin links 74 which are pivoted at 75 to the head of a pushrod 76 which head is disposed above the part 63 of the tongs carrier 61. The pushrod is slidably mounted in a bore 64 and is urged downwardly by a spring 77 owing to the action of which, it extends, at rest, downwardly from the ends of the jaws 66, as shown in FIGS. 9 and 11. It will be understood from the description of the operation of the tool E, that the elements 72, 73, 74, 75, constitute a unidirectional connecting means connecting the pushrod 76 to the cross, these means being operative to rotate the cross and the cam 69 only in the clockwise direction.

This tool E operates in the following manner. In the position of rest shown in FIG. 9, the cam 69 has its large faces vertical and the two jaws are urged together by the spring 68. Under these conditions, the end hooks 67 of the jaws 66 can be easily engaged in the opening 14 of the plug 10 which is in position on the member 6 and covers the end element 9 of the needle 8.

Thus, it is sufficient—after having selected the tool E by rotating the barrel 39—to urge the latter downwardly by means of the jacks 34, 35 and introduce the tongs in the plug, the pushrod 76 extending downwardly beyond the jaws of the tongs. Consequently, in the last part of the descent of the tool, the pushrod 76 is urged upwardly with respect to the rest of the tongs within the bore 64 (FIG. 10) and, through the medium of the links 74 and the lugs 73 acting on the cross 72 connected to the cam 69, causes the latter to rotate through 90° so that its large side becomes horizontal. The cam therefore spreads the two jaws 66 apart and they move from the position shown in FIG. 9 to that shown in FIG. 10. Therefore, when the tool carrier is moved upwardly along the axis W—W the hooks 67 of the jaws 66 bear against the inner shoulder 15 of the plug and thus draw the latter out of the member 6.

The plug remains temporarily suspended from the tongs until a further action, that is, until the member 6 is required to be replugged, since upon a downward movement of the tool E provided with a plug 10 in the position shown in FIG. 11 this plug is first engaged in the member 6 and then, in abutting the end of the member 6 together with the continued downward movement of the tool, the pushrod 76 once again comes in contact with the plug and is urged upwardly relative to the jaws and causes a further rotation through 90° of the cam 69. This causes the jaws to move toward each other under the effect of the spring 68 and the plug is thus left in its plugging position. The tool E is finally moved upwardly to its inactive position of rest.

*Sampling tool F*

This tool fills the bottles or other containers in which is previously created a vacuum. These containers consist, in the presently-described embodiment, of small bottles such as 79 of glass, metal or other material of cylindrical shape and provided with a neck 80 closed in a sealed manner by a plug 81 of rubber or the like which is capable of being pierced by the needle 8 or 8a, the seal remaining after withdrawal of the needle by the automatic closure of the small hole pierced by the needle owing to the elasticity of the rubber.

The tool F comprises a longitudinal tube 82 open at both ends and in which the bottles 79, 79a, 79b are slidable longitudinally, one behind the other. The tube 82 is secured in the tool-carrying barrel 39 and terminates at its lower end in an attached head 83 provided with an inner groove containing a sealing and braking ring 84 adapted to hold the first bottle 79 in position. This bottle must be put in communication with a vacuum and then filled.

Secured to the upper end of the tube 82 is the breech 85 of a revolver-type loader, having a barrel 86 in which are disposed at least two diametrally opposed bottles and which is rotatable about a pivot 87 parallel to a longitudinal axis Y—Y of the tool so as to feed in succession and one by one, bottles, such as the bottle 79m, to a position in alignment with the tube 82, the thus positioned bottle being thereafter fed forwardly by a plunger 88 connected to an operating lever 89 which is slidably mounted in a longitudinal slot 90 formed in the breech 85.

In the position shown in FIG. 14, the plunger 88 is in its extreme forward position and the last bottles of the series of bottles disposed in the tube 82 are shown at 79l and 79k. The tube 82 has such length that in this position of the plunger, the first bottle 79 retained by the ring 84, which acts in opposition to the action of gravity exerted on the entire column of bottles, extends beyond the head 83 such distance that when the assembly of the tool F is moved forwardly (position shown in FIG. 15), the bottle 79 engages in the member 6 to such extent that the upward extension of the needle 8 or 8a beyond the end element 9 can enter the bottle in piercing the plug 81, as shown in FIG. 15.

In this position, and if it concerns the needle 8a, this needle creates a vacuum in the bottle, whereas, if it concerns a needle 8, the liquid drawn off by this needle from the corresponding container (such as R, FIG. 1), automatically rises in the bottle 79 and fills the latter. It will be understood that the tool F is returned to a rear position before positioning a new bottle and before discharging the filled bottle. This discharging takes place automatically when positioning a further empty bottle. With the bottle 79 filled and the tool withdrawn, it is sufficient to move back the plunger 88, rotate the barrel 86, and once more shift the plunger to its extreme position for the bottle 79m to take the place of the bottle 79l and, through the other empty bottles, expel from the head 83 of the tool the filled bottle 79 which drops from the tool into the glove box A from which it is automatically extracted by a discharging device having a trough or other means (not shown).

Rinsing tool G

This tool (FIGS. 17 and 18) rinses the needle 8 which was used for taking a sample and comprises a tubular body 91 fixed in the tool-carrying barrel 39 in combination with a tubular sleeve 92 which extends beyond the bottom of the tube 91. Slidable in the lower end of this tube is a piston 93 which is downwardly biased by a spring 94 disposed about a tubular extension 95 of the piston 93 between a collar 96 bearing against the bottom end of the tube 91 and another collar 97 fixed in an adjustable manner on the tubular extension 95 which is screw-threaded for this purpose.

The piston 93, which is sealed inside the tube 91 (forming a cylinder) by a sealing element 98 and rings 99, has, together with its extension 95, a longitudinal passageway 100 for the ejection of the rinsing liquid toward the needle 8 when the latter has pierced, after downward movement of the tool D, a rubber plug 101 fixed to the end of the extension 95 (see FIG. 18).

A reserve of rinsing liquid 102, such as water or acid, is contained in the chamber 103 in the tube 91 which forms a cylinder between the upper end of the piston 93 and the cage 104 of a ball check-valve 105. This valve permits replenishing the reserve of liquid 102 by admission of rinsing liquid by way of a longitudinal passageway 106 formed in a member 107. The latter is fixed in the tube 91 by a rod 108 which bears against a plug 109 screwed on the upper end of the tube 91.

The tool G operates in the following manner. When this tool G is moved downwardly, at the end of its travel the part of the needle 8 extending beyond the end element 9 pierces the plug 101 which ordinarily closes the passageway 100 of the piston 95 then, as this plug bears against the upper end of the end element 9 and the body of the tool continues to descend, this piston is urged upwardly with compression of the spring 94 and the volume of the chamber 103 is reduced. As the ball 105 is applied against its seat, the rinsing liquid 102 cannot be discharged into the passageway 106. The liquid is therefore urged downwardly through the passageway 100 into the needle 8 which is consequently rinsed. As soon as the tool rises, the needle emerges from the plug 101 and the hole it formed in the latter closes owing to the elasticity of the rubber so that there is no leakage of the rinsing liquid remaining in the tool.

Under the effect of the spring 94, the piston 95 resumes its initial position. No suction occurs between this piston and the body 104 owing to a further supply of liquid contained in the passageway 106.

II.—Operation of the sampling bench and the tools thereof

The assembly is directed, by a rotation of the support B about the vertical axis V—V, to the vacuum-creating station, that is to say, to the needle 8a. By rotating the tool carrier about the axis W—W, the sample-taking tool F is brought onto the axis of this needle 8a which is connected to the source of vacuum.

The tool carrier D is shifted downwardly and the first bottle 79 (FIG. 14) has the plug thereof pierced by the needle 8a. After a pause, the tool carrier is raised and the bottle 79 containing a vacuum is ready to receive a sample.

In actuating the assembly comprising the handwheel and the selecting collar (26–27), the reference 28 of the selected part is brought in front of the fixed reference or needle 29 and the assembly is rotated about the vertical axis V—V by the handwheel 20 until the support B is locked, as explained hereinbefore.

In rotating the tool carrier about the axis W—W, the tool E is placed in front of the liquid supply for seizing the plug 10 corresponding to the selected needle. After completely raising the tool E, the tool carrier is rotated one third of a rotation in the direction opposed to the preceding movement so as to move the sample taking tool F back in front of the selected needle.

The sample is drawn off and, after rinsing the tool F and rotating the tool carrier, the rinsing tool or syringe G is brought into its operative position.

Owing to the movement in translation of the tool carrier, the piston 93 of the syringe injects the rinsing liquid into the needle 8 and then, subsequent to a full raising and a further rotation of the tool carrier, the tool E (which still carries the plug 10) is placed back over the selected needle and, by a further downward movement, the plug is put back in position. This operation is followed by the full raising of the tool carrier.

The sample selector is then shifted to the discharging station reference and, by rotating the support, the tool carrier is brought in line with the discharging station. In rotating the tools, the bottle which has just been filled is placed over the discharging station. In this position the plunger operating lever 89 is accessible to the operator who shifts the plunger upwardly, introduces a new empty bottle in the tube 82 by rotating the storage barrel 86, shifts the plunger 89 downwardly which displaces the stack of bottles and ejects the bottle containing the sample.

A further empty bottle 9 is placed in the barrel 86 for the following operation.

It will be observed that the vacuum-creating station can be advantageously common with that of the discharging station (this was the hypothesis adopted in the preceding description where the number of stations is equal to $n$, $n$ being the total number of needles 8 and 8a). Thus the tool-carrying assembly returns to its initial position.

III.—*Variant shown in FIG. 19*

In the first of the embodiments described hereinbefore the centres of the ends of the end elements of the needles are located on the circumference of the plane U—U which is perpendicular to the axis V—V of rotation of the support B, so that, as explained in detail, the axis W—W of the tool carrier describes a cone having an apex O.

However, it must be understood that the invention is not intended to be limited by such an arrangement and the kinematic movements mentioned. The invention is intended to embrace any bench which permits by a displacement of the support a selection among a number of needles which are disposed in such manner as to be swept through by the axis of the tool carrier.

Thus, in the embodiment shown in FIG. 19, the centres $a^1$, $b^1$, $c^1$ of the end elements are located on an arc of a circle M–N whose centre coincides with the intersection O of the pivot axis $V^1$—$V^1$ of the support $B^1$ and the axis W—W of rotation and sliding of the tool carrier D. The support $B^1$ is in fact pivotally mounted by means of trunnions 110 mounted in bearings (not shown) carried by the glove box of the bench.

By pivoting the support $B^1$ about the axis $V^1$—$V^1$ in either direction, it is possible to select any needle and the rotation and sliding of the tool carrier D permits, as in the first embodiment, a selection of any one of the three tools E, F, and G and a longitudinal displacement of the selected tool (together with the other tools which are however offset laterally).

IV.—*Protection from radiations*

It will be understood that when the bench and the tools thereof are intended for taking radio-active samples, it is well to provide the usual means for protecting the user from radiations.

For protection from alpha particles the transparent panels of the glove box are of course mounted with seals and clamped at the joints. The base 4 and the members 6 receiving the end elements 9 of the needles include toric sealing elements in suitable grooves. In the mechanical assembly the rotating parts are mounted with lipped seals and the sliding part with a toric seal. All the tools are mounted with a seal between the tool and the tool-carrying barrel 39.

As concerns protection from gamma radiations, the upper mechanical part and the tools consist of massive elements corresponding to a protection of at least 7 cm. of lead. The protection on the periphery of the bench is independent of the latter and composed of lead plates. On the front side, namely the working side, a porthole and handling tongs are provided in the box.

Although specific embodiments of the invention have been described, many modifications and changes may be made therein without departing from the scope of the invention as defined in the appended claims.

Thus the tool carrier can comprise more than three tools or one of the tools described hereinbefore could be replaced by any other tool, these tools being detachable as is clear from the foregoing description.

Having now described our invention what we claim as new and desire to secure by Letters Patent is:

1. A bench for taking liquid samples, and in particular radio-active liquid samples, said bench comprising in combination: a glove box having a base, a plurality of hollow needles for placing respectively in chambers containing the liquid, end elements of said needles mounted on the base, the end elements having centres on their ends which are disposed on at least an arc of a circle, a rotary support mounted above the end elements for rotation about a first axis, a tool carrier rotatably mounted in the support for rotation about a second axis different from said first axis, the tool carrier being movable along the second axis, and a plurality of tools mounted in the tool carrier in eccentric relation to and at equal distances from the second axis, said tools being employed in succession in the taking of the samples.

2. A bench for taking liquid samples, and in particular radio-active liquid samples, said bench comprising in combination: a glove box having a base, a plurality of hollow needles for placing respectively in chambers containing the liquid, end elements of said needles mounted on the base, the end elements having centres on their ends which are disposed on a circumference contained in a plane, a rotary support mounted above the end elements for rotation about a first axis perpendicular to said plane, a tool carrier rotatably mounted in the support for rotation about a second axis which is concurrent with the first axis and inclined relative thereto, the tool carrier being movable along the second axis, and a plurality of tools mounted in the tool carrier in eccentric relation to and at equal distances from the second axis, said tools being employed in succession in the taking of the samples, said inclination being such that when the support is rotated about the first axis the extension of the second axis can be brought successively to a distance from each of said centres of the ends of the end elements which is equal to the eccentricity of the tools relative to the second axis.

3. A bench for taking liquid samples, and in particular radio-active liquid samples, said bench comprising in combination: a glove box having a base, a plurality of hollow needles for placing respectively in chambers containing the liquid, end elements of said needles mounted on the base, the end elements having centres on their ends which are disposed on a circumferential arc contained in a plane, a rotary support mounted above the end elements for rotation about a first axis which is perpendicular to said plane, a tool carrier rotatably mounted in the support for rotation about a second axis which is contained in said plane and is perpendicular to the first axis, the tool carrier being movable along the second axis, and a plurality of tools mounted in the tool carrier in eccentric relation to and at equal distances from the second axis, said tools being employed in succession in the taking of the samples.

4. A bench as claimed in claim 1, comprising a selecting device in combination with the support for bringing said second axis of the tool carrier in line with any selected one of the end elements.

5. A bench as claimed in claim 4, wherein the selecting device is combined with a locking device for locking the support in the selected position.

6. A bench as claimed in claim 5, wherein the selecting device comprises a graduated rotary collar, an index co-operating with the collar which moves in front of the index, the collar having an inner face and a cavity in the inner face, a fixed member around which the collar is rotatably mounted, a number of apertures and rods slidable in the apertures in the fixed member, the number of apertures corresponding to the number of needles, the rotary support comprising a locking element which is resiliently biased radially outwardly, each of the rods being withdrawable from its corresponding aperture into the cavity when in alignment with the cavity, the locking element being engageable in the aperture of that one of the rods which has withdrawn into the cavity.

7. A bench as claimed in claim 1, wherein one of the tools is an unplugging tool for removing and replacing in position plugs disposed on the tops of the end elements of the needles, said unplugging tool comprising tongs, a cam co-operating with the tongs, and a pushrod capable of bearing against the plug in the plugging position and co-operating with the cam for rotating the cam, the opening and closing of the tongs being effected by the cam.

8. A bench as claimed in claim 1, wherein one of the tools is a sample-taking tool which comprises a tube for receiving empty sample-taking bottles disposed in alignment one after the other in the tube, a head provided at the bottom end of the tube and including braking means for retaining the bottom bottle in which a vacuum is to be created and which is to be filled thereafter, a breech of the revolver type provided at the upper end of the tube, the breech having a rotary barrel having apertures in which further empty bottles can be placed, the barrel being adapted to load further empty bottles into the tube one by one, a plunger carried by the breech for displacing, after loading each bottle, the series of bottles contained in the tube a distance corresponding to the length of one bottle, whereby the bottom bottle which has been filled with the liquid sample is expelled from the tube and the series of bottles in the tube is fed downwardly to the extent of one bottle.

9. A bench as claimed in claim 1, wherein one of the tools is a rinsing tool which comprises a syringe having a piston and a return spring biasing the piston, the piston being movable by contact with the end element of the rinsed needle.

10. A bench for taking liquid samples, and in particular radio-active liquid samples, said bench comprising in combination: a glove box having a base, a plurality of hollow needles for placing respectively in chambers containing the liquid, end elements of said needles mounted on the base, the end elements having centres on their ends which are disposed on at least an arc of a circle, a rotary support mounted above the end elements for rotation about a first axis, a tool carrier rotatably mounted in the support for rotation about a second axis different from said first axis, the tool carrier being movable along the second axis, and a plurality of tools mounted in the tool carrier in eccentric relation to and at equal distances from the second axis, said tools being employed in succession in the taking of the samples, the tool carrier comprising a sleeve which is slidably mounted in the support and a tool-carrying barrel slidably mounted in the sleeve.

11. A bench as claimed in claim 10, comprising jacks operatively connected to the sleeve and to the barrel for respectively rotating the sleeve and sliding the barrel.

12. A bench as claimed in claim 10, comprising a locking device co-operating with the barrel for locking the barrel in the various desired angular positions thereof, the jack for rotating the barrel being operatively connected to the barrel by a ratchet wheel which constitutes a free wheel structure on the barrel.

13. A bench as claimed in claim 12, wherein the barrel-rotating jack has a moving element on which is formed a rack, and a toothed wheel which meshes with the rack is rigid with the ratchet wheel.

14. A bench for taking liquid samples, and in particular radio-active liquid samples, said bench comprising in combination: a glove box having a base, a plurality of hollow needles for placing respectively in chambers containing the liquid, end elements of said needles mounted on the base, the end elements having centres on their ends which are disposed on at least an arc of a circle, a rotary support mounted above the end elements for rotation about a first axis, a tool carrier rotatably mounted in the support for rotation about a second axis different from said first axis, the tool carrier being movable along the second axis, and a plurality of tools mounted in the tool carrier in eccentric relation to and at equal distances from the second axis, said tools being employed in succession in the taking of the samples, the tool carrier carrying three tools, namely an unplugging tool for removing and replacing in position plugs disposed on the tops of the end elements of the needles, a sample-taking tool for filling bottles disposed in the sample taking tool, and a rinsing tool for cleaning the needle through which a sample has just been taken, the bench further comprising a special needle connected to a source of vacuum for creating a vacuum in each bottle before collecting the liquid sample in the bottle.

15. An unplugging tool, in particular for a bench for taking samples, said bench including end elements to be unplugged from sample-taking means, said tool comprising a tongs carrier having a first axis, a pair of tongs pivotally mounted on said carrier and having free tong ends outwardly engageable with said end elements and movable between an outer position and an inner position relative to said first axis, a cam mounted on said carrier to rotate about a second axis substantially perpendicular to said first axis and located between said tongs so as to engage the tongs, said cam having pairs of diametrally opposed first and second cam faces located at two different distances from said second axis whereby upon rotation of said cam through a fraction of a complete rotation said pairs of first and second cam faces alternately put said free tong ends in said inner and outer positions respectively, means for maintaining said tongs in engagement with said cam, a cam rotating member connected to said cam for rotation therewith about said second axis and having as many branches as there are cam faces on said cam, a pushrod mounted on said carrier to slide along said first axis toward and away from said second axis, elastically yieldable means biasing said pushrod in a direction away from said second axis, link means connected to said pushrod, unidirectional connecting means including said branches operatively connecting said link means to said cam rotating member, said unidirectional connecting means being operative to rotate said cam rotating member and said cam through said fraction of a complete rotation when said pushrod is shifted toward said second axis and inoperative when said pushrod is shifted away from said second axis by the action of said elastically yieldable means, whereby reciprocation of said pushrod toward and then away from and then toward said second axis puts said tongs ends alternately in said outer position and then in said inner position.

16. A tool for taking liquid samples, in particular for a bench for taking samples, the bench including end elements on sample-taking means, said tool comprising a tube for receiving empty sample-taking bottles disposed in alignment one after the other in the tube, a head provided at the bottom end of the tube and including braking means for retaining the bottom bottle in which a vacuum is to be created and which is to be filled thereafter, a breech of the revolver type provided at the upper end of the tube, the breech having a rotary barrel having apertures in which further empty bottles can be placed, the barrel being adapted to load further empty bottles into the tube one by one, a plunger carried by the breech for displacing, after loading each bottle, the series of bottles contained in the tube a distance corresponding to the length of one bottle, whereby the bottom bottle which has been filled with the liquid sample is expelled from the tube and the series of bottles in the tube is fed downwardly to the extent of one bottle.

17. A rinsing tool for an end element carrying a needle to be rinsed, said needle projecting from the end element, said tool comprising a tubular body, a piston axially slidable therein, a return spring biasing the piston outwardly of the body, the piston being movable inwardly of the body in opposition to the action of the spring by contact with the end element, the piston defining with the body a chamber and having a throughway axially extending passageway communicating at one end of the passageway with said chamber, a plug of an elastomer material closing the end of the passageway remote from the end of the passageway, communicating with said chamber, said plug being piercable by said needle before the piston encounters the end element and capable of elastically closing and sealing the end of the passageway after extraction of the needle from the plug, an aperture in the body for connecting a rinsing liquid supply to said chamber and valve means associated with said aperture for allowing flow of rinsing liquid into said chamber and preventing flow of rinsing liquid out of said chamber, whereby the piercing of the plug by the needle followed by the shifting of the piston by the end element inwardly of the body causes the needle to be rinsed and the withdrawal of the needle from the plug and the shifting of the piston outwardly of the body by action of said spring replenishes said chamber with rinsing liquid.

References Cited

UNITED STATES PATENTS

| | | | |
|---|---|---|---|
| 2,660,342 | 11/1953 | Ruf | 73—425.6 X |
| 2,718,459 | 9/1955 | Leveritt et al. | 73—259 |
| 2,968,183 | 1/1961 | Hannaford et al. | 73—421 |
| 3,199,911 | 8/1966 | Alliot et al. | 294—95 |

FOREIGN PATENTS 581,208   8/1959   Canada.

DAVID SCHONBERG, *Primary Examiner.*

LOUIS R. PRINCE, *Examiner.*

C. S. SWISHER, *Assistant Examiner.*